(No Model.)
S. T. McDOUGALL.
HOLLOW CORKSCREW.
No. 285,143. Patented Sept. 18, 1883.
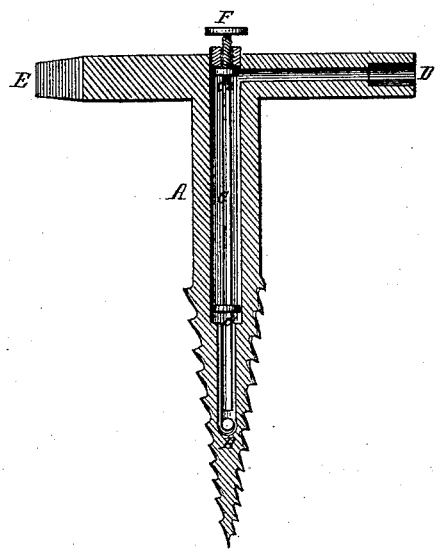
WITNESSES.
S. Baldwin Chapman.
K. F. Champney
INVENTOR.
Samuel T. McDougall.

UNITED STATES PATENT OFFICE.

SAMUEL T. McDOUGALL, OF BROOKLYN, ASSIGNOR OF ONE-HALF TO WILLIS A. BARNES, OF NEW YORK, N. Y.

HOLLOW CORKSCREW.

SPECIFICATION forming part of Letters Patent No. 285,143, dated September 18, 1883.

Application filed July 7, 1883. (No model.)

*To all whom it may concern:*

Be it known that I, SAMUEL T. McDOUGALL, a citizen of the United States, residing at Brooklyn, in the county of Kings and State of New York, have invented a new and useful Improvement in Hollow Corkscrews and Combination-Tools, of which the following is a specification, reference being had to the accompanying drawing, forming part thereof.

The drawing represents a sectional elevation, showing the different parts.

The objects of my invention are to produce a cheap and durable hollow corkscrew for drawing champagne, aerated waters, or other liquids, and to combine with it other useful parts, as hereinafter described.

In the drawing, A represents a sectional elevation of my invention, showing the interior construction. I construct my hollow corkscrew and combination-tool of any suitable metal, and with an outside screw cast or formed on it from near the middle of the main stem to the point, as shown. On the upper end of the main stem is a cross-handle. The main stem is drilled or cored out in the center, commencing at the top of the handle and extending down to near the point of the screw. An opening is made between the screws a short distance above the point and connecting with the inside opening, as shown at B. The inside opening in the main stem is contracted near the bottom, so as to form a valve-seat for the valve C'.

C is a valve stem or wire, passing from above the handle to near the opening B. On this valve-stem are valves C' and C². C' closes, by a downward motion of the valve-stem C, on the seat formed by the contraction of the opening in the main stem. C² closes by an upward movement of the valve-stem C, which carries the valve C² up against the bottom of a plug placed in the opening in the top of the handle. The valves are made of disks of metal with yielding surfaces, or they can be made conical or ball-shaped. The plug in the top of the handle has an opening through the center with a screw-thread cut in it. Through this opening the upper end of the valve-stem C passes, it having a corresponding screw cut on it near the upper end.

On the top of the valve-stem C is a milled button, F, for the purpose of moving the valves up and down.

A ring or cross-handle can be attached to the upper end of the valve-rod C in place of the milled button F.

One end of the handle has an opening through it and connecting with the opening in the main stem. The outer end of this opening is made square and answers the purpose of a clock or other key, as show at D. The opposite end is formed into a screw-driver, as shown at E.

The operation of my invention is as follows: The corkscrew is screwed down into and through the cork, so that the opening B will be below the bottom of the cork inside the bottle. Turn the milled button F. This will raise the valve C' from its seat, and will also raise the valve C² up and against the bottom of the plug in the handle, making it tight around the valve-stem. The liquor will then flow out through the handle at D. To stop the liquor, reverse the motion of the button F.

Having fully described my invention, what I desire to claim and secure by Letters Patent is—

1. A hollow corkscrew provided with an outlet-opening through the handle and with two valves, mounted on the same valve-rod, acting inside the main stem of the corkscrew, and operated by a ring, handle, or button on the top of the valve-rod, whereby both the valves can be operated, one to close the opening into the bottle, the other to pack around the valve-rod to prevent leakage when being used, substantially as shown and described.

2. The combination of the corkscrew A, clock-key D, and screw-driver E, constructed and arranged substantially as described.

3. As a new article of manufacture, a hollow corkscrew consisting of the hollow stem, screw, and handle A, provided with a valve-rod, C, and valves C' and C² and valve-seats, button F, screw-driver E, and clock-key D, all arranged and operated substantially as described.

SAMUEL T. McDOUGALL.

Witnesses:
K. F. CHAMPNEY,
T. THORNTON CALLAGAN.